April 30, 1940.  G. L. BRIGGS  2,199,280
LAWN MOWER
Filed Sept. 5, 1939  3 Sheets-Sheet 2
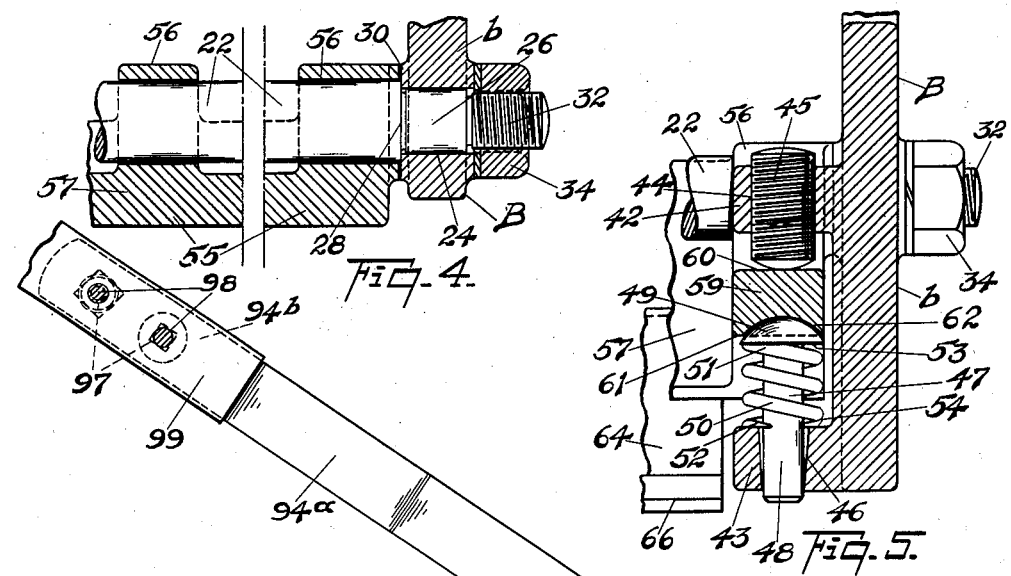
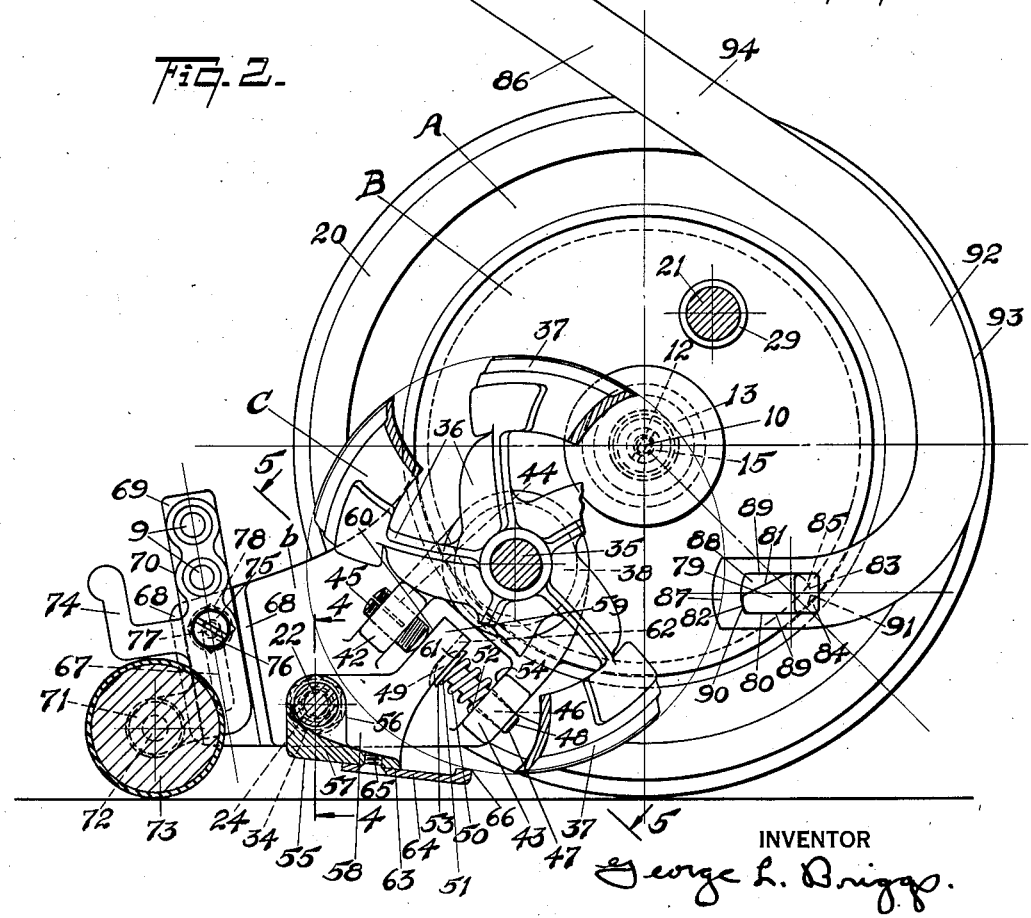
INVENTOR
George L. Briggs.

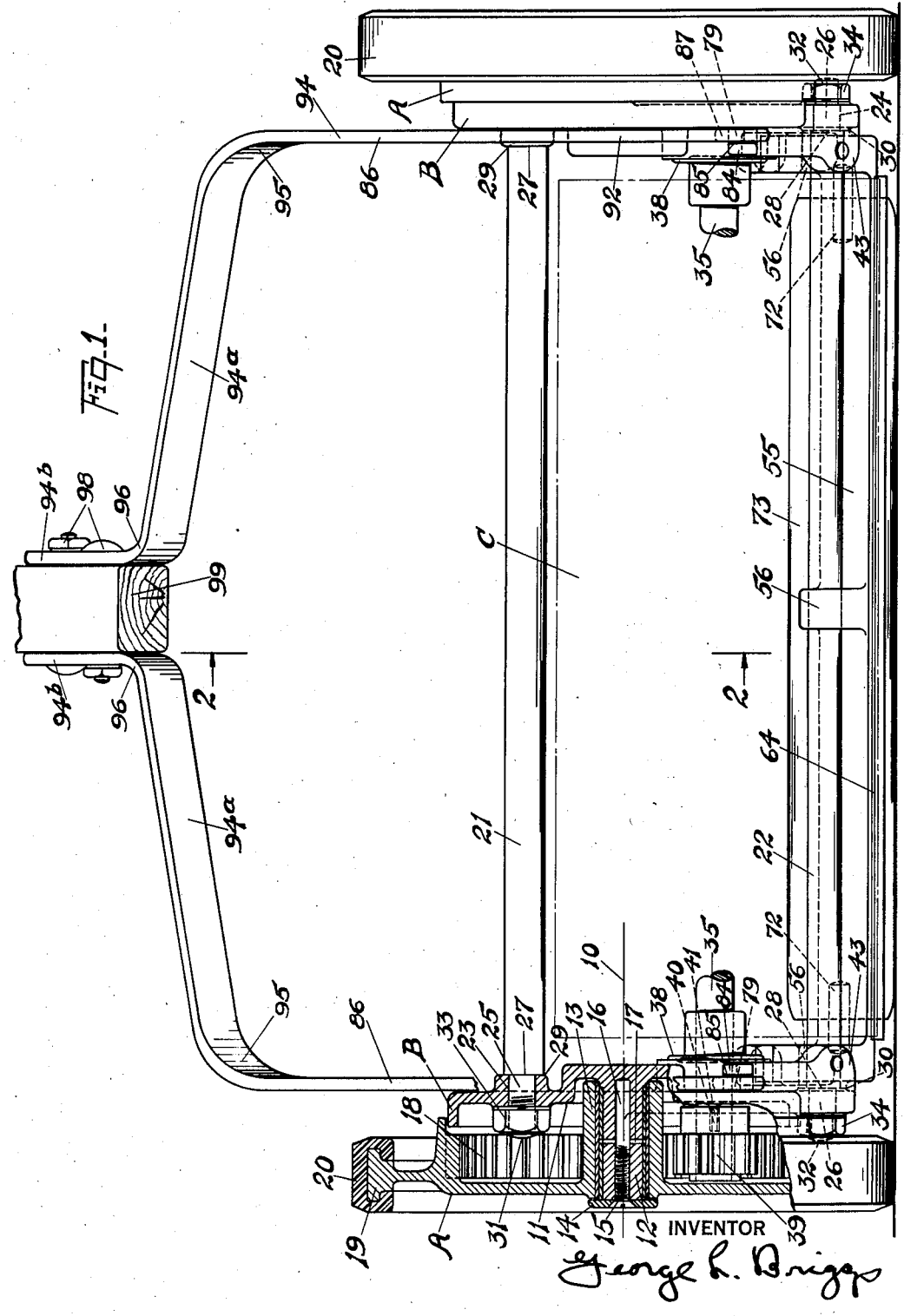

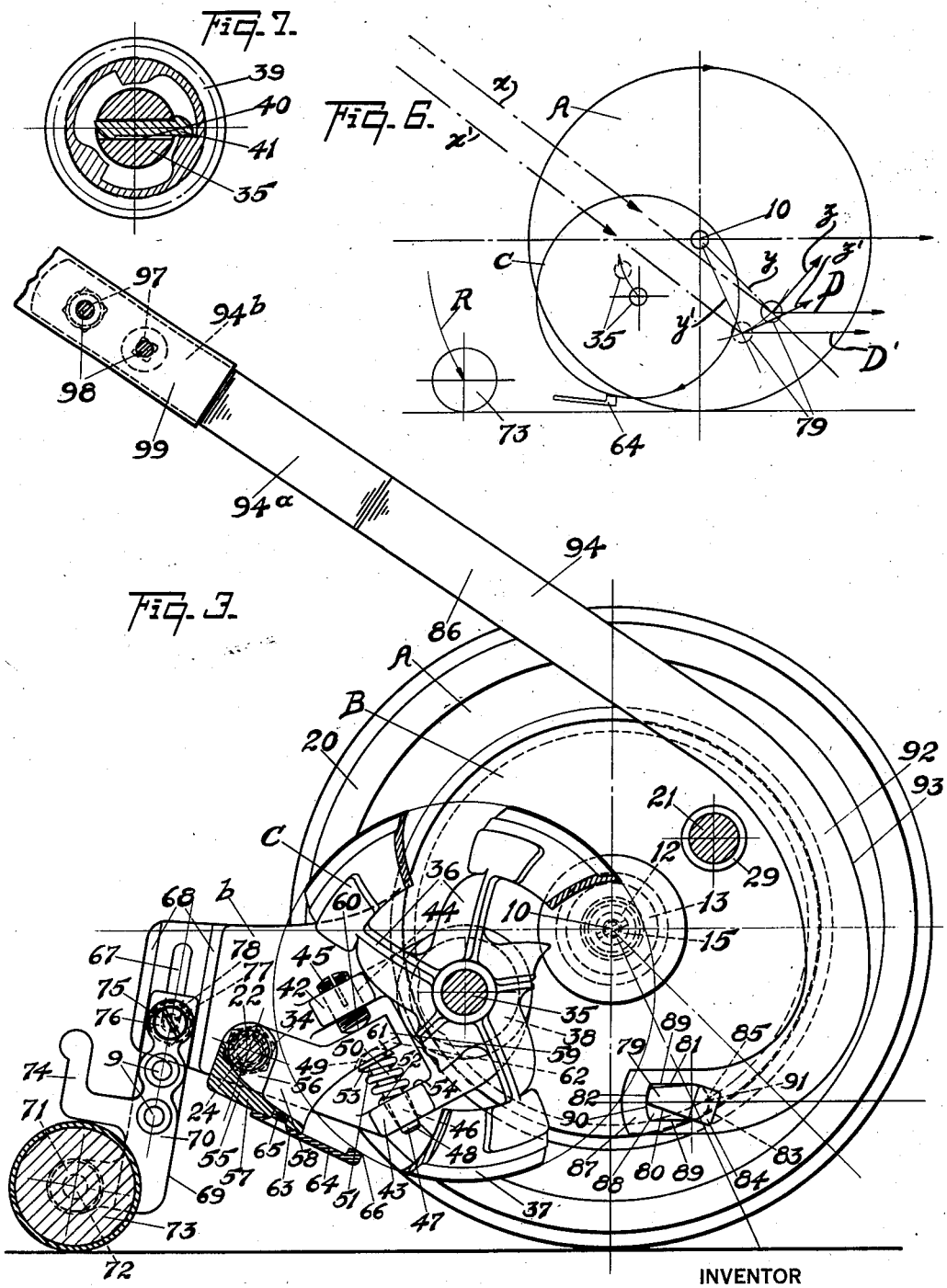

Patented Apr. 30, 1940

2,199,280

UNITED STATES PATENT OFFICE 2,199,280

LAWN MOWER

George L. Briggs, Oneida, N. Y.

Application September 5, 1939, Serial No. 293,342

10 Claims. (Cl. 56—253)

This invention relates to improvements in lawn mowers, and particularly to hand-operated lawn mowers.

A serious disadvantage of lawn mowers heretofore known is that there is a tendency of the mower to jump away from the ground at the rear end, especially where the lawn contains coarse and tough grass in spots, where there is an uneven contour of the ground, or where the cutting reel encounters twigs or similar material which is not easily cut or which suddenly chokes and stops the rotation of the cutting reel.

The principal object of the invention is to provide a lawn mower in which the above mentioned disadvantage will be counteracted.

A further object is to prevent twigs or other material which cannot be severed by the cutters from choking and thereby suddenly stopping the reel, which causes a strong tendency of the rear end of the machine to rise from the ground.

A still further object is to provide a machine in which the depth of cut may be readily adjusted without introducing any disadvantageous tendency of the machine to rise from the ground at its rearward or trailing end.

With these general objects in view and some others which will be obvious to those skilled in the art from the description hereinafter, a lawn mower embodying my invention comprises a connection for the propulsive means which is located so as to develop both a forward pull on the machine generally parallel to the ground and simultaneously a downward push at the rear of the machine. This combined result is attained by making the connection of the machine to the propulsive means along an axis forward of and below the axis through the center of the wheels which serve to rotate the reel and which may be termed the axis of traction.

In the best embodiment of the invention there is provided a floating backing bar, upon which the stationary cutter blade is detachably mounted, so that non-severable material, such as wire, twigs or small stones, which accidentally become interposed between the cutting reel blades and the stationary cutter blade, may readily pass therebetween without serious injury to the blades, thus avoiding the sudden slowing or stoppage of the cutting reel and the consequent jump which would result therefrom. Also means are provided whereby the stationary cutter blade may be adjusted to the proper relation with the cutting reel, with which it coacts, by a single screw located in each side frame, and this adjustment is made possible without disturbing, when once assembled, the rigidly fixed four point suspension of the side frames which carry the rotatably mounted cutting reel therebetween. This avoids the objectionable adjust and try method which must be practiced when mowers of the prior art are used, especially in that type of mower in which the backing bar, which carries the stationary cutter blade, acts as one of the tie rods to hold the side frames in alignment. Furthermore, these desirable results are attained while avoiding the costly and cumbersome self-locking worm gears and sectors, heretofore employed with yieldable cutter blades.

The invention will now be described in connection with the best embodiment thereof illustrated in the present drawings, in which:

Figure 1 is a front elevation of a mower, partly in section and partly broken away, with some of the parts omitted;

Figure 2 is a sectional view taken on the line 2—2 of Figure 1 showing the parts in their respective operative relation when the mower is adjusted to its lowest cutting position;

Figure 3 is a sectional view, similar to Figure 2, showing the mower when adjusted to its highest cutting position;

Figure 4 is a cross-sectional view, enlarged and partly broken away, taken on the line 4—4 of Figure 2, showing the floating backing bar mounted upon the rigidly connected rear tie rod;

Figure 5 is a cross-sectional view, enlarged and partly broken away, taken on the line 5—5 of Figure 2, showing the adjusting and floating means in detail;

Figure 6 is a diagrammatic view illustrating the directional forces acting upon the mower when the propulsive force is applied in accordance with the invention; and Figure 7 is a cross-sectional view, enlarged, showing one of the actuating pinions mounted upon the cutting reel shaft.

Referring to the drawings, Figure 1 shows a mower of the so-called high wheel type as viewed from the front thereof. Since it is the usual practice in the art to use the terms right and left when referring to the respective component parts, as if the observer were standing behind the mower, therefore what would normally be called its right hand side appears at the left side in Figure 1. Furthermore, since the mower is symmetrical about a vertical longitudinal plane, one side only of the driving means need be described and in this case the description will be given of the right side, it being understood that the left side driving mechanism is analogous.

Upon the driving wheel A at the rotative axis 10 thereof a side frame B is mounted, this side frame being provided upon its outer side 11 with a sleeved trunnion 12, which takes bearing within and is carried by a bushed bearing 13, formed integral with the drive wheel A. This drive wheel and side frame are held in detachable operative relation by a washer 14 and a screw 15 which take bearing, respectively, upon the end of the trunnion 12 and within a threaded bore 16 formed in said trunnion, the bore 16 also providing an oil reservoir for the bearing 13 to which the bore 16 is connected by oil grooves 17 drilled transversely through the trunnion 12.

Within the driving wheel B and in this case formed integral therewith, an internal driving gear 18 is provided, the function of which will be more fully described hereinafter in connection with the cutting means of the mower. While the driving wheel A may have a plain rim, that is, a rim of metal, it has been found advantageous to provide the wheel rim 19 with a rubber shoe 20, to increase the traction thereof where machines of light weight are used.

Means for holding the side frames in rigid spaced relation with each other are provided. It will be seen from Figures 1, 2 and 3, the side frames B, when assembled, are held in spaced rigid relation to each other by tie rods 21, 22, these tie rods being arranged to take bearing within bores 23, 24, respectively, formed in the side frames B, in the following manner. Adjacent the ends of each tie rod 21, 22, a reduced portion 25, 26, is formed, thus providing a shoulder 27, 28, upon each end of each tie rod, these shoulders being arranged to take bearing upon finished bosses 29, 30, respectively, formed on the inner side of each side frame; also, upon each end of each tie rod 21, 22, extending outward from said shoulders and extending through each side frame B beyond the outer side thereof a threaded portion 31, 32, is provided, to which nuts 33, 34 are attached to hold said tie rods and said side frames in fixed rigid relation relative to each other.

It also will be seen from Figures 1, 2 and 3 that one of said tie rods, 21, positioned upon the side frames at a point which is above and forward of the axis of rotation of the driving wheels, that the other tie rod, 22, is positioned below and to the rear of this axis rotation, and that intermediate these rods 21, 22, and the side frames B a rotatable cutting reel, C, is mounted. The rotating axis of said reel C lies below and to the rear of the axis of the trunnions 12 carried by the driving wheels A. The rotatable cutting reel C comprises a shaft 35, spaced spider arms 36 rigidly connected to said shaft, and cutting blades 37, rigidly connected to said spider arms. The shaft 35 is rotatably mounted in bearings 38, carried by the side frames B, the shaft extending through said bearings 38 to such an extent as will allow driven pinions 39 to be freely mounted upon the outer ends thereof, which pinions are arranged to mesh with the internal gears 18 formed in the driving wheels A. Intermediate each end of the shaft 35 and the respective bearing 38 there is provided within the shaft an elongated slot 40, said slot extending transversely through the shaft and in the direction of the length thereof, into which driving pawls 41 are slidably mounted, these pawls being arranged to interconnect the driven pinions 39 and shaft 35 to cause rotation of the cutting reel C when pinions 39 are caused to rotate by the internal gears 18 formed in the driving wheels A, while at the same time allowing the reel to rotate freely by its own momentum when the pinions 39 slow down or stop.

Upon the trailing portion b of each side frame B, on the inner side thereof, and intermediate the longitudinal axes of the rear tie rod 22, and cutting reel C, a pair of opposed lugs 42, 43, are provided, said lugs being formed in spaced relation relative to each other, one of which, the upper lug 42, being provided with a threaded bore 44 into which a threaded adjustable set screw 45 is mounted. Within the lower lug 43 and in axial alignment with the threaded bore 44 formed in the upper lug 42, there is provided a tapered bore 46, into which a floating push rod 47 takes bearing, said push rod 47 comprising a shank portion 48 and a convexly shaped head 49 formed integral thereon. Surrounding the shank portion 48 and held in operative relation thereby, a compression spring 50 is mounted, the respective ends 51, 52, of which are arranged to take bearing upon the flat under side 53 of the head 49 and the upper surface 54 of the lug 43. The function of these floating push rods 47, carrying the compression springs 50, in conjunctive operative relation with the adjustable set screws 45, will be more fully described hereinafter in connection with the floating backing bar with which they coact.

Mounted upon the rigidly fixed tie rod 22 and having limited axial rotation thereabout, a floating backing bar 55 is freely carried independent of the two side frames B, said backing bar comprising a plurality of bearing portions 56, the example, as best shown in Figure 1, being three in number, a body portion 57 depending from said bearing portions and extending forward therefrom, and two connecting portions 58, each one of which is located adjacent the outer ends of the backing bar and extend forward from the outer bearings thereof. These connecting portions have their reduced forward ends arranged to be interposed intermediate the floating push rods 47 and the adjustable set screws 45, carried by the side frames B, in a manner hereinafter fully described.

Extending forward from each connecting portion 58, at an angle to the transverse axis of the backing bar, reduced portions 59 are provided, upon the upper surfaces 60 of which the set screws 45 take bearing. Upon the under surfaces 61 of said reduced portions there are provided concave grooved bearings 62, into which, by the reaction of the compression springs 50 acting upon the push rods 47, the convexly shaped heads 49 of the floating push rods 47 are caused to take bearing. These grooved bearings 62 extend in a direction which is transverse to the longitudinal axis of the backing bar 55 and advantageously to the outer forward edge of the forward extending reduced portions 59.

Upon the under surface 63 of the backing bar 55, extending forward therefrom, a stationary cutter blade 64 is detachably mounted, as by screws 65. The transverse width of this blade 64 is of a measure sufficient to allow its forward cutting edge 66 to lie substantially tangent to the outer path of the cutting reel blades 37, with which it coacts when in its properly adjusted position.

While compression springs of various strengths may be used, it is advantageous and it is to be understood that in the present invention the springs are so formed as to provide that the total minimum compressive strength of the springs is greater than the total shearing resistance of the total sum of the severable grasses that may be interposed at any one time intermediate the cutting blades of the rotating reel and the stationary cutter blade carried by the backing bar, and that the total maximum compressive strength of the springs is less than the shearing resistance of any non-severable material that may be interposed between said blades, such as twigs, wire or similar materials.

While there have been attempts in the prior art to provide so-called single screw adjustment, in each side frame, of the stationary cutter blade, which is normally carried by the backing bar, the means heretofore provided to achieve this desirable result have generally been to provide a threaded stud, which is adjustably mounted in each side frame, said stud having a threaded body portion and a threaded reduced shank portion extending from said body portion, thus providing a shoulder upon which the upper surface of the forward extending ends of the backing bar take bearing, the forward extending end of the backing bar being provided with an aperture through which the reduced shank portion of the threaded stud extends, to receive upon its lower outer end a compressive means, which is held in maximum deflection against the lower surface of the forward extending end of the backing bar, by a threaded nut affixed to the outer end of the threaded reduced shank portion of the stud, thus allowing of the turning of the stud, relative to the backing bar which is held in fixed frictional engagement with the stud. But since the backing bar has been arranged to act as the rear tie bar to hold the side frames in alignment, it is always necessary to loosen the backing bar from the side frames to which it is rigidly attached before the adjusting screws mounted in the side frames can be turned relative to the backing bar. Then after adjusting the screws, to which the backing bar is fixedly held by the compressive means, to a position which is thought proper, the backing bar is again tightened to the side frames, but in so doing, the adjustment as made, which was thought to be proper, is found not to be; this disadvantageous result being caused by the necessary loosening and tightening of the backing bar from and to the side frames, thus disturbing the alignment of the backing bar relative to the side frames. It then becomes necessary to adjust over again, and after several attempts a compromise is generally reached.

It will be obvious from the above that heretofore so-called single screw adjustment has required several operations to be performed before a desired result could be obtained. It will be seen that in the present invention this advantageous result is accomplished by the simple turning right or left of the slotted set screws 45 located in each side frame. In thus moving the set screws in or out the stationary cutter blade 64 is caused to move away from or toward the rotatable cutting reel blades 37 by the reaction of the compression springs 50 acting upon the floating push rods 47 which take bearing upon the reduced portions 59, thereby causing said reduced portions 59, which are formed integral with the backing bar, to follow the set screws 45 in or out, whichever the direction desired may be; also, it will be obvious that the reduced portions 59 forming a part of the backing bar are free to move toward the push rods 47 and away from the set screws 45, thereby allowing the stationary cutter blade 64 to move away from the cutting reel blades 37 when any non-severable material, such as a wire, nail, small twig or stone, becomes interposed therebetween, whereby serious injury to blades is avoided, and that the reduced portions 59 will again move back to contact the adjusted set screws after the non-severable object has been removed or has passed through the opposing blades.

It will be obvious from the above and with the description hereinbefore given in connection with the drawings, that a simple, efficient and inexpensive, yieldable backing bar carrying the stationary cutter blade is provided; a backing bar which allows of easy and fine adjustment without disturbing the fixed rigid alignment of the side frames relative to each other, or the alignment of the backing bar relative to the side frames, a backing bar in which the cross-section area is considerably reduced, as compared to backing bars of the prior art, while maintaining comparative rigidity therewith, this result being accomplished in a simple manner, in the example best shown in Figure 1, where only three bearings forming a part of the backing bar are provided, one of which is formed intermediate the length of the backing bar. By so disposing the intermediate bearing of the bar relative to its length, the lever arm of deflection has been reduced to one-quarter the overall length, minus the width of one outer bearing, of the bar. It is to be understood that as many bearings as desired may be provided throughout the length of the bar, to achieve any predetermined minimum of unit deflection that may be desired.

Upon the rearward ends of the trailing portion b of each side frame B, means are provided for adjustably mounting a pair of roller brackets thereto, said means comprising an elongated slot 67 extending substantially transverse to the length of the side frame and a pair of inwardly extending flanges 68 on each side frame, said flanges being in parallel spaced relation to the elongated slot and extending substantially the full depth of the trailing portion. Thus a slotted bearing groove is provided upon the inner side of each side frame, into which, roller brackets 69 are slidably mounted in a manner hereinafter fully described. Each of said roller brackets comprises a body portion 70, having formed upon its lower end a bearing portion 71, into which a trunnion 72 carried upon the respective end of a roller 73 takes bearing. Above the bearing portion 71 extending from the body portion 70 first rearward thence upward a lug 74 is provided, to which may be attached a grass collecting bag if desired. Within the body portion 70, adjacent the upper end therof and aligned in the direction of its length, a plurality of opertures 9 are provided, into any one of which a screw 75, having a slotted head 76 and a threaded shank 77, may be inserted, the shank 77 of said screw 75 being of a length sufficient to extend through the body portion 70 and the elongated slot 67, formed in the side frame B, to a point beyond the outer surface of the trailing portion b, where, upon the outer end of said threaded shank a threaded nut 78 is affixed, whereby the bracket 69 carrying the roller 73 is held in frictional engagement with the side frame B, thus allowing of the raising or lowering of the trailing portion of the side frame relative to the roller, upon which the trailing portions are carried. It will be seen that by adjusting the roller up or down, relative to the side frames, the stationary cutter blade 64 will be caused to raise or lower proportionately, and that any desired height of the cutter blade 64, with respect to the ground, may be achieved, within the limits of the adjustment.

Heretofore in the art unless the handle arms are fastened in fixed relation to the side frames, it has been the practice to attach the means for propelling a mower, that is, the handle braces or forked arms extending from the handle, at a point upon each side frame which lies within the boundaries of the upper rearward quadrant of the driving or traction wheels. In so doing several disadvantageous characteristics are incorporated in machines of the hand operated type, the reasons being that since most mowers have approximately twenty degrees of axial movement of the side frames about the carrying or tractive axis of the driving wheels, to allow of various adjustments of the stationary cutter bar up or down, within the maximum and minimum adjustment of the trailing roller. Therefore, means must be and are provided at the points of interconnection between the handle braces and the side frames to allow for said adjustment, these means generally being accomplished by forming the lugs, generally provided upon each side frame, in such a manner relative to the elongated slots, generally provided in the ends of the handle braces which take bearing upon the lugs, as will allow of the axial adjustment of the side frames about the carrying axis without acting upon the hand grips of the handle, which are normally held at a constant height irrespective of the height of cut being made, the lugs generally being formed wedge-shaped.

As above mentioned, in such prior art where the handle grips can be kept at a constant height the points of interconnection between the handle braces and the side frames are made at a point above and to the rear of the tractive axis of the machine. It will be obvious that when a mower is adjusted for a low cut, similar to the one as shown in Figure 2, the cutter bar and its coacting parts will be free to have axial movement about the tractive axis of the mower within the limits of the connection of the handle braces and the wedge-shaped lugs, these limits generally being equal to the axial adjustment of the machine. It also will be obvious that since the propelling effort applied at the handle grips must be in excess of the resistant effort of the machine when in normal operation, to cause the machine to move forward, any excess resistance encountered between the cutting reel blades and the stationary blade, caused by a heavy cut being taken, will and does cause the side frames carrying the cutting reel and stationary blade to rotate or bobble about the tractive axis of the machine, by the excess effort which must be applied at the handle grips, whereby the machine jams, it is then necessary to pull the machine bodily backwards to start the cut over again, this disadvantageous result being caused by the handle braces, attached to the side frames at a point which is above and to the rear of the tractive axis, tending to overrun the tractive axis of the machine.

Another disadvantage of machines of the prior art that have propelling means attached to the side frames, as described above, is that the resultant of the angle of effort as applied to a machine by the user thereof, is of such a magnitude, with respect to the plane of the surface over which the machine is pushed, as to cause excessive digging into the ground of the traction or driving wheels, thereby compelling a user of this type machine to expend energy uselessly for a given amount of work.

It being common knowledge that a resistant tractive load can be more easily and readily pulled than pushed over a yieldable surface, the principal object of this invention is to provide means whereby the advantageous results of pulling the machine may be achieved by pushing a mower of the hand-operated type, while at the same time avoiding any possibility of the operator unduly forcing the driving wheels into the ground in the usual operation of the mower. These means will now be fully described and pointed out in connection with the accompanying drawings.

Upon the inner surface of each side frame B, and wholly within the lower forward quadrant of the driving or tractive wheel A, there is provided an elongated tapered pulling lug 79, said lug being formed integral with said side frame, the lower surface 80 of this lug being caused to lie in a plane substantially parallel to the horizontal axis of the mower when adjusted to its lowermost position, as best shown in Figure 2. The upper surface 81 of said lug which is below the plane of the tractive axis is arranged to taper downward toward the rear of the side frame, this taper being in a degree which is equal to or greater than the maximum degree of axial adjustment of the side frame about its tractive axis, and the ends 82, 83 of said lug 79 are so formed as to provide arcuate bearing surfaces. Upon the forward portion of said lug 79, adjacent end 83, a retaining ear 84 is formed integral thereon, said ear 84 extending first outward, thence forward from the body of the lug, thus providing a recess 85 intermediate the ear and the inner surface of the side frame.

While the connection of the handle shaft to the mower may be accomplished in various manners, as for example, by providing bifurcated or forked connecting ends, it is advantageous for economy in manufacture and ease of assembly to form the connecting means separate from the handle shaft, as in the manner shown and which will now be fully described.

Upon each lug 79, formed on each side frame B, there is detachably connected a curved handle brace 86, said brace being advantageously formed from bar stock, such as steel, of the proper size. Each said handle brace 86 is provided upon its connecting end 87 with an elongated closed aperture 88, said aperture being so formed that its longitudinal parallel walls 89 provide a slightly wider transverse width than the maximum transverse width of the lug 79, and the end surfaces 90, 91 of said aperture are so formed as to provide arcuate bearing surfaces which match the arcuate ends 82, 83, respectively, formed on the lug 79.

Extending forward from the end 87 of the brace 86, in the direction of the length of the aperture 88, thence upward and rearward thereof, a curved portion 92 is provided, the outside radial edge 93 of said curved portion being so formed as to be caused to lie within the outer peripheral diameter of the traction wheel, the reason for which will be more fully described hereinafter. Integral with and extending upward and rearward from said curved portion 92, in a plane tangential thereto, a portion 94 is provided, said portion 94, intermediate its length, being formed with reverse bends 95, 96, thus providing an inward extending portion 94a, intermediate the bends, and an attaching portion 94b extending rearward from the inner bend 96. The portion 94b is provided with punched apertures 97 capacitated to receive bolt assemblies 98 which are inserted therethrough to attach the handle braces 86 to the forward end of rearward extending handle 99, upon the rearward end of which the handle grips (not shown) are affixed.

It will be seen in forming and mounting handle braces in the manner as heretofore described that the handle braces when mounted upon the pulling lugs are caused to take bearing intermediate the retaining ears formed integral on the lugs and the inner surface of the side frames, whereby accidental disengagement of the braces from their respective lugs is avoided.

It also will be obvious in forming the curved ends so their outer radial edges are caused to lie within the outer peripheral surface of the traction wheels, when the lower edges of the lugs are in limiting engagement with the lower wall surfaces of the apertures formed in the ends of the braces, that it is possible to turn the mower over in an inoperative position to wheel the mower from one place to another, as may be desired, without interference from the handle braces, as by dragging upon the surface of the ground over which the mower may be then moving.

From the description hereinbefore given it will be seen that, the side frames, carrying the rotatable cutting reel and stationary cutter blade, are freely carried upon the tractive axis of the driving wheels, that these severing means are located below and to the rear of said tractive axis, and that the pulling lugs, to which the handle braces are attached, lie wholly below and forward of the tractive axis; also, that the effort applied at the handle grips must be in excess of the resistant effort in order for the mower to be moved. The thrust on the handle grips is at an angle downward and is to be considered as acting along a line extending from the axis of the handle to the transverse axis of the points of connection of the members 86 with the lugs 79. This line of force is indicated at $x$ in Fig. 6.

The force acting along this line may be resolved into a horizontal force, indicated by the arrow D, Fig. 6, and into a force tangential to the lines joining the tractive axis and the points of connection of the members 86 with the lugs 79, such a line being indicated at $y$, Fig. 6. The tangential force is indicated by the line $z$, Fig. 6, and because the tractive axis is maintained at a fixed distance from the ground by the wheels of the machine the tangential force $z$ tends to cause a torque which will endeavor to rotate the side frames and the roller 73 about the tractive axis in a counter-clockwise direction, along the arc R, Fig. 6, thereby pressing and maintaining the roller 73 firmly against the ground.

Fig. 6 shows diagrammatically two positions of the lugs 79, one, the full unbroken circle, being the upper position of the lugs relative to the tractive axis when the roller 73 is adjusted relative to the side frames for the lowest cutting position of the machine as shown in Fig. 2, whereupon the force acting to push the machine forward is indicated by the arrow D and the other position of the lugs 79, the broken dotted circle showing force and directional lines $x'$, $y'$ and $z'$ which are analogous to the force and directional lines $x$, $y$ and $z$ heretofore described, being that position the lugs assume relative to the tractive axis when the roller 73 is adjusted relative to the side frames to bring the machine into its highest cutting position as shown in Fig. 3, in which case the line of force tending to move the machine forward is along the line D'.

Owing to the production of the torque above referred to and the resultant downward pressure of the roller 73 against the ground, no bobbling of the side frames about the tractive axis can occur. This avoids the jamming of the cutting means, irrespective of the depth of the cut being taken or the unevenness of the surface over which the mower is being moved.

As the resultant in the direction of the arrow D, or D', is always substantially parallel to the surface over which the mower is being moved no excessive digging of the traction wheels into the ground can take place.

While the push-pull means as described may be applied to machines having adjustably fixed, non-yielding cutter blades, serious damage to the cutting means may be incurred, this being due to the propulsive means being connected to the mower forward of and below the tractive axis, whereby positive control and inhibition of any axial movement of the side frames about the tractive axis are accomplished, and this control remains positive and constant even when non-severable objects become interposed between the blades. Therefore, it is advantageous to provide the mower with a yieldable normally stationary cutter blade as shown and described. It is to be understood that this yieldable means may also be used advantageously in mowers not having the push-pull means as described.

What is claimed is:

1. In a lawn mower, the combination, with a pair of driving wheels and two side frames carried upon the tractive axis of said wheels, means for holding said side frames in spaced rigid alignment, a ground roller adjustably connected to each side frame rearward of said tractive axis, a rotatably mounted cutting reel carried by the side frames and arranged to be driven from the driving wheels and a co-operating cutter blade member carried intermediate the side frames, of a connecting means located forward of and wholly below said tractive axis, and propelling means arranged to take bearing upon said connecting means and angularly movable vertically relative to the side frames.

2. In a lawn mower, the combination, with a pair of driving wheels and two side frames carried upon the tractive axis of said wheels, means for holding said side frames in spaced rigid alignment, a ground roller adjustably connected to each side frame rearward of said tractive axis, a rotatably mounted cutting reel carried by the side frames and arranged to be driven from the driving wheels and a co-operating cutter blade member carried intermediate the side frames, of a connecting means located forward of and wholly below said tractive axis, and propelling means arranged to take bearing upon said connecting means and angularly movable vertically relative to the side frames, said propelling means comprising a handle shaft having a forked forward end arranged to extend rearward from said connecting means, said shaft having hand grips affixed to its rearward extending end.

3. In a lawn mower, the combination, with a pair of driving wheels and two side frames carried upon the tractive axis of said wheels, means for holding said side frames in spaced rigid alignment, a ground roller adjustably connected to each side frame rearward of said tractive axis, a rotatably mounted cutting reel carried by the side frames and arranged to be driven from the driving wheels and a co-operating cutter blade member carried intermediate the side frames, a connecting means upon each side frame located forward of and wholly below the said tractive axis, and rearward extending propelling means arranged to take bearing upon said connecting means and angularly movable vertically relative to the side frames, said propelling means comprising a handle shaft having a forked forward end arranged to extend over and rearward of the said tractive axis and having hand grips affixed to its rearward extending end.

4. In a lawn mower, the combination, with a pair of driving wheels and two side frames carried upon the tractive axis of said wheels, means for holding said side frames in spaced rigid alignment, a ground roller adjustably connected to each side frame rearward of said tractive axis, a rotatably mounted cutting reel carried by the side frames and arranged to be driven by the driving wheels, and a co-operating cutter blade member carried intermediate the side frames, a connecting means upon each side frame located forward of and wholly below the said tractive axis, said connecting means comprising a pulling lug arranged on each side frame, and a rearward extending propelling means arranged to take bearing upon each said pulling lug and angularly movable vertically relative thereto, said propelling means comprising curved handle braces arranged to extend over and rearward of the said tractive axis, said braces having their rearward end portions detachably connected to the forward end of a handle shaft, said shaft having hand grips affixed to its rearward extending end.

5. In a lawn mower, the combination, with a pair of driving wheels and two side frames carried upon the tractive axis of said wheels, tie rods rigidly connected to each side frame and arranged to hold said side frames in spaced rigid alignment, a ground roller adjustably connected to each side frame rearward of said tractive axis, a rotatably mounted cutting reel carried by the side frames intermediate said tie rods and arranged to be driven by the driving wheels, and a co-operating yieldable cutter blade member carried by one tie rod independently of the side frames, a connecting means located forward of and wholly below said tractive axis, and propelling means arranged to take bearing upon said connecting means and angularly movable relative thereto, said propelling means comprising a handle shaft having a forked forward end arranged to extend over and rearward of the said tractive axis, said handle shaft having hand grips affixed to its rearward extending end.

6. In a lawn mower, the combination, with a pair of driving wheels and two side frames carried upon the tractive axis thereof, tie rods rigidly connected to each side frame in spaced alignment relative to one another, a ground roller adjustably connected to each side frame rearward of said tractive axis, a rotatably mounted cutting reel carried by the side frames intermediate said tie rods, and a co-operating yieldable cutter blade member carried by one tie rod independently of the side frames, said cutter blade member comprising a plurality of bearings arranged longitudinally of said tie rod, a body portion depending from said bearing portions having affixed to it a cutter blade, and lever arms adjacent each end of said cutter blade member, said lever arms arranged transverse the longitudinal length of said body portion, a connecting means located forward of and below said tractive axis, and rearward extending propelling means arranged to take bearing upon said connecting means, said propelling means having hand grips affixed to its rearward extending end.

7. In a lawn mower, the combination, with a pair of driving wheels and two side frames carried upon the tractive axis of said wheels, tie rods rigidly connected to each side frame arranged to hold said side frames in spaced rigid alignment, a ground roller adjustably connected to each side frame rearward of said tractive axis, a rotatably mounted cutting reel carried by the side frames intermediate said tie rods, and a co-operating yieldable cutter blade member freely carried on one tie rod independently of the side frames, a connecting means upon each side frame located forward of and below said tractive axis, said connecting means comprising a pulling lug arranged on each side frame, and a rearward extending propelling means arranged to take bearing upon each said pulling lug, said propelling means comprising curved handle braces arranged to extend over and rearward of the said tractive axis, said braces having the rearward end portions detachably connected to the forward end of a handle shaft, said shaft having hand grips affixed to its rearward extending end.

8. In a lawn mower, the combination, with a pair of driving wheels and two side frames carried upon the tractive axis of said wheels, tie rods rigidly connected to each side frame arranged to hold said side frames in spaced rigid alignment, a ground roller adjustably connected to each side frame rearward of said tractive axis, a rotatably mounted cutting reel carried by the side frames intermediate said tie rods, and a co-operating yieldable cutter blade member freely carried on one tie rod independently of the side frames, a cutter blade detachably connected to said yieldable member, and lever arms adjacent each end of said yieldable member, said lever arms having axial rotation about the axis of said tie rod, an adjusting means mounted upon each side frame adjacent the end of each said lever arm arranged to contact each said lever arm respectively, a resilient means located upon each side frame, each said resilient means being mounted independently of and in opposition to the respective adjusting means mounted in the respective side frame, whereby the cutter blade carried by the yieldable member is free to move about the axis of the tie rod, away from or toward the cutting reel, a connecting means carried by said side frames, and propelling means arranged to take bearing on said connecting means.

9. In a lawn mower, the combination, with a pair of driving wheels and two side frames carried upon the tractive axis of said wheels, tie rods rigidly connected to each side frame, a ground roller adjustably connected to each side frame, a rotatably mounted cutting reel carried by the side frames intermediate said tie rods, a co-operating yieldable cutter blade member freely carried on one tie rod independently of the side frames, and a cutter blade detachably connected to said yieldable member, a lever arm adjacent each end of said yieldable member, an adjusting means mounted upon each side frame adjacent the end of each lever arm and arranged to contact each said lever arm respectively, a resilient means mounted on each side frame, said resilient means being mounted independently of and in opposition to the respective adjusting means mounted in the respective side frame, a connecting means located forward of and below said tractive axis, and propelling means arranged to take bearing upon said connecting means, said propelling means comprising a handle shaft having a forked end arranged to extend over and rearward of said tractive axis from said connecting means, said shaft having hand grips affixed to its rearward extending end.

10. In a lawn mower, the combination, with a pair of driving wheels and two side frames carried upon the tractive axis of said wheels, tie rods rigidly connected to each side frame, a ground roller adjustably connected to each side frame, a rotatably mounted cutting reel carried by the side frames intermediate said tie rods, and a co-operating yieldable cutter blade member freely carried on one tie rod independently of the side frame, said yieldable cutter blade member comprising a plurality of bearing portions arranged longitudinally of said tie rod, a body portion depending from said bearing portions, a cutter blade detachably connected to said body portion, and lever arms adjacent each end of said body portion, said lever arms arranged transverse the longitudinal length of said body portion, an adjusting means mounted upon each side frame adjacent the end of each lever arm and arranged to contact each said lever arm respectively, a resilient means mounted on each side frame, said resilient means being mounted independently of and in opposition to said adjusting means mounted on the respective side frame, said resilient means arranged to take bearing upon said lever arms, a connecting means upon each side frame located forward of and below said tractive axis, and propelling means arranged to take bearing upon said connecting means, said propelling means comprising curved handle braces arranged to extend over and rearward of said tractive axis, said braces having their rearward end portions detachably connected to the forward end of a handle shaft, said shaft having hand grips affixed to its rearward extending end.

GEORGE L. BRIGGS.